US006177025B1

United States Patent
Ring et al.

(10) Patent No.: US 6,177,025 B1
(45) Date of Patent: Jan. 23, 2001

(54) ABSORPTION HEAT PUMPS HAVING IMPROVED EFFICIENCY USING A CRYSTALLIZATION-INHIBITING ADDITIVE

(75) Inventors: Terry A. Ring; James A. Dirksen, both of Sandy, UT (US)

(73) Assignee: University of Utah, Salt Lake City, UT (US)

( * ) Notice: Under 35 U.S.C. 154(b), the term of this patent shall be extended for 0 days.

(21) Appl. No.: 09/193,520

(22) Filed: Nov. 17, 1998

(51) Int. Cl.$^7$ ..................................................... C09K 5/00
(52) U.S. Cl. ................................. 252/69; 62/112; 62/476
(58) Field of Search .............................. 252/69; 62/112, 62/476

(56) References Cited

U.S. PATENT DOCUMENTS

| | | | |
|---|---|---|---|
| 1,734,278 | 11/1929 | Tandberg | 252/69 |
| 2,041,741 | 5/1936 | Bichowsky | 62/179 |
| 2,199,123 | 4/1940 | Whitney | 62/115 |
| 2,876,247 | 3/1959 | Rätz et al. | 260/461 |
| 2,986,525 | 5/1961 | Hughes | 252/67 |
| 3,004,919 * | 10/1961 | Rush et al. | 252/67 |
| 3,276,217 | 10/1966 | Bourne et al. | 62/101 |
| 3,296,814 | 1/1967 | Lynch et al. | 62/112 |
| 3,316,728 * | 5/1967 | Biermann | 62/112 |
| 3,316,736 | 5/1967 | Biermann | 62/502 |
| 3,458,445 | 7/1969 | Macriss et al. | 252/69 |
| 3,478,530 | 11/1969 | Aronson | 62/112 |
| 3,516,248 | 6/1970 | McEwen | 60/36 |
| 3,524,815 | 8/1970 | Hensel, Jr. et al. | 252/68 |
| 3,541,013 | 11/1970 | Macriss et al. | 252/69 |
| 3,553,136 | 1/1971 | Lyon | 252/69 |
| 3,555,841 | 1/1971 | Modahl et al. | 62/114 |
| 3,609,087 | 9/1971 | Chi et al. | 252/69 |
| 3,643,455 | 2/1972 | Hensel, Jr. et al. | 62/112 |
| 3,783,631 | 1/1974 | Modahl et al. | 62/112 |
| 3,968,045 | 7/1976 | Sibley | 252/68 |
| 4,018,694 | 4/1977 | Anderson | 252/69 |
| 4,019,992 | 4/1977 | Krueger | 252/68 |
| 4,138,855 | 2/1979 | Jahan et al. | 62/112 |
| 4,563,295 | 1/1986 | Erickson | 252/69 |
| 4,612,133 * | 9/1986 | Bertocchio et al. | 252/68 |
| 4,614,605 | 9/1986 | Erickson | 252/69 |
| 4,783,277 | 11/1988 | Koseki et al. | 252/69 |
| 4,793,940 | 12/1988 | Borde et al. | 252/69 |
| 4,857,222 | 8/1989 | Itoh et al. | 252/69 |
| 4,990,277 | 2/1991 | Rolland et al. | 252/69 |
| 5,108,638 | 4/1992 | Iizuka et al. | 252/69 |
| 5,419,145 | 5/1995 | Chandler et al. | 62/112 |
| 5,468,303 | 11/1995 | Thomas, Sr. | 134/3 |
| 5,529,709 | 6/1996 | Rockenfeller | 212/69 |
| 5,547,600 | 8/1996 | Downey | 252/68 |
| 5,577,388 | 11/1996 | Chandler et al. | 62/112 |
| 5,653,117 | 8/1997 | Kujak | 62/112 |
| 5,746,059 * | 5/1998 | Sarkisian et al. | 62/101 |
| 5,766,504 * | 6/1998 | Shoji et al. | 252/69 |

FOREIGN PATENT DOCUMENTS 9-280683 * 10/1997 (JP).

OTHER PUBLICATIONS

Dirksen et al, "LiBr Crystallization Inhibition, Second Annual Report", Department of Chemical Engineering, University of Utah, for Gas Research Institute, May 1997.*
Chemical Abstracts, AN 4672–38–2, "PPA", No month available 1999.*
Chemical Abstracts, Registry No. 6419–19–8, 2000.*
Herold, Keith E. and Rademacher, Reinhard: *Absorption Heat Pumps*, Mechanical Engineering, pp. 68–73 (Aug., 1989).
Dirksen, James A. and Ring, Terry A.: *LiBr Crystallization Inhibition, Second Annual Report*, Department of Chemical Engineering, University of Utah, for Gas Research Institute, Contract No. 5094–260–2895 (May 1997).

* cited by examiner

*Primary Examiner*—Necholus Ogden
(74) *Attorney, Agent, or Firm*—Pauley Petersen Kinne & Fejer

(57) ABSTRACT

An absorption heat pump achieves improved efficiency by lowering the low cycle temperature of the circulation fluid. This is accomplished by adding a crystallization-inhibiting compound to the circulation fluid which substantially depresses the temperature at which the absorbent salt in the fluid begins to crystallize.

19 Claims, No Drawings

ABSORPTION HEAT PUMPS HAVING IMPROVED EFFICIENCY USING A CRYSTALLIZATION-INHIBITING ADDITIVE

FIELD OF THE INVENTION

This invention is directed to absorption heat pumps which achieve improved efficiency by widening the difference between the high and low temperatures of the working fluid. In particular, the invention is directed to additives which depress the crystallization/precipitation temperature of salt contained in the working fluid.

BACKGROUND OF THE INVENTION

In heat pumps of the absorption type, an absorbent, diluted with an absorbed refrigerant, is heated in a generator to vaporize some of the refrigerant. The refrigerant vapor then flows to a condenser where it is condensed to a liquid by heat exchange with an external cooling fluid maintained at a low temperature by a heat sink. The liquefied refrigerant then flows through a valve to an evaporator which vaporizes the refrigerant (usually at low pressure) to produce refrigeration.

The vaporized refrigerant then flows to an absorber where it is absorbed by concentrated absorbent supplied from the generator. From the absorber, the diluted absorbent passes to the generator where it is concentrated by heating to vaporize some of the refrigerant, and thus repeat the cycle.

Conventional absorption heat pumps typically employ an aqueous solution of lithium bromide as an absorbent and water as a refrigerant. The operating efficiency of these heat pumps increases with the difference between the highest fluid temperature where the solution is dilute in lithium bromide and water is being vaporized, and the lowest fluid temperature where the solution is very concentrated in lithium bromide and water is being absorbed. When operating in a refrigeration/air conditioning mode, the high temperature is fixed by the ambient temperature. When operating in a temperature boosting mode, the high temperatures can reach 98° C., 177° C., and 232° C. for single, double and triple effect machines, respectively. Some of these machines are described in Herold and Radermacher "Absorption Heat Pumps". *Mechanical Engineering*, August 1989, pp.68–73. Since the high cycle temperature is generally fixed by the application and/or pump type, the efficiency of the cycle can be increased by lowering the low cycle temperature.

As the low cycle temperature is reduced in an air conditioning application, the concentration of lithium bromide must be increased in order to permit the continued absorption of water vapor. As the salt concentration is increased and the temperature is decreased, a solubility limit is approached. If the solubility limit of lithium bromide in water is exceeded, hydrated salt crystals may form which block the flow circulation in the absorber, rendering it useless. Thus, conventional absorption heat pumps use solutions containing about 60–62% salt, and operate at a minimum fluid temperature of about 4–7° C. in air conditioning applications. For heating applications, the salt concentration may be lowered, to prevent freezing of the solution at temperatures down to −25° C. or lower.

Absorption heat pumps have many large-scale uses in industrial air-conditioning and refrigeration, as well as heating and temperature boosting. There is always a need or desire for more efficient heat pumps which maximize the difference between the high and low fluid temperatures at different parts of the cycle.

SUMMARY OF THE INVENTION

The present invention is an absorption heat pump which achieves a greater difference between the high and low fluid temperatures of the circulation fluid, by reducing the minimum fluid temperature to levels not previously contemplated. Additives have been discovered which inhibit the crystallization and precipitation of lithium bromide from water at concentrations of 60–62% lithium bromide and temperatures below about 4° C., without adversely affecting 1) the heat capacity of the solution, 2) the solution rheological properties, 3) the solution diffusion or mass transfer coefficients, or 4) the ability of the solution to absorb water vapor and transfer heat in the process. In an absorption cycle, these additives permit operation at a lower low temperature, thereby improving the efficiency of the cycle. The increased efficiency makes the absorption heat pump more cost effective compared to conventional refrigeration technologies.

The additives for the aqueous lithium bromide solution can reduce the minimum low fluid temperature from about 4–7° C. to about 0° C. or lower. Some of the additives can reduce the minimum low fluid temperature to −5° C. or lower, to −8° C. or lower, or even to −10° C. or lower. The additives can also be used to reduce the minimum low fluid temperature in applications using lower concentrations of lithium bromide in water.

Suitable additives are those which form complexes with lithium and/or bromine ions in aqueous solution. The additives and complexes formed may 1) decrease the crystallization driving force, causing supersaturation, 2) increase the critical supersaturation needed for effective nucleation, and/or 3) decrease the crystal growth rate. Useful additives include compounds which form complexes with the lithium and bromine ions in solution, and which alter the surface energy of crystal embryos formed in solution just prior to nucleation.

With the foregoing in mind, it is a feature and advantage of the invention to provide an aqueous lithium bromide solution useful in absorption heat pumps, which has a wider range of cycle temperature due to a lower minimum temperature for the onset of crystallization.

It is also a feature and advantage of the invention to provide an absorption heat pump having greater efficiency due to a wider range of cycle temperatures and a lower minimum cycle temperature.

The foregoing and other features and advantages will become further apparent from the following detailed description of the presently preferred embodiments, read in conjunction with the examples. The detailed description and examples are merely illustrative rather than limiting, with the scope of the invention being defined by the appended claims and equivalents thereof.

DETAILED DESCRIPTION OF THE PRESENTLY PREFERRED EMBODIMENTS

In accordance with the invention, an absorption heat pump is provided which is operable using an aqueous circulation fluid including a hygroscopic salt as an absorbent material and water as a refrigerant. The preferred hygroscopic salt includes lithium bromide, alone or in combination with one or more additional absorbent materials or aids. The solution should contain about 30–85% by weight total absorbent material, preferably about 40–75% by weight, more preferably about 55–65% by weight. In practice, the maximum absorbent salt concentration will be the concentration at saturation at the lowest temperature experienced by the solution during operation.

The salt concentration must, at minimum, be sufficient to effectively absorb the refrigerant at the lowest cycle temperature. The minimum salt concentration useful for this purpose increases as the solution temperature is lowered, until a low temperature is reached where the minimum and maximum concentrations converge at a saturation level. For a solution employing only lithium bromide as the absorbent and only water as the refrigerant, an optimum salt concentration of about 60–62% yields both absorption and saturation at a minimum operating temperature of about 4–7° C.

The present invention is directed primarily toward lowering the minimum operating temperature of solutions containing lithium bromide and water. to levels below the conventional minimum temperatures. To this end, crystallization-inhibiting compounds of selected types and amounts are added to the aqueous solution of lithium bromide and water. The additives are present in low concentrations, typically up to about 5000 molar ppm, more typically about 200–2000 molar ppm, most typically about 500–1500 molar ppm. The term "molar ppm" is based on the amount of lithium bromide in the solution. For instance, an additive level of 500 molar ppm means the solution contains 500 moles of crystallization-inhibiting additive for every million moles of lithium bromide.

It is desirable to employ crystallization-inhibiting additives that are effective at such low concentrations. This way, the additives have no significant effect on 1) the heat capacity of the solution, 2) the solution rheological properties, 3) the solution diffusion or mass transfer coefficients, or 4) the ability of the solution to absorb water vapor and transfer heat. As explained above, the crystallization-inhibiting additives are effective for lowering the minimum operating temperature of a solution containing 60–62% by weight lithium bromide (i.e. the onset of crystallization) to no more than about 0° C. preferably no more than –5° C. more preferably no more than –8° C. most preferably no more than –10° C.

On the other hand, it has been found that increasing the concentration of the crystallization inhibitor lowers the freezing point of the solution. Thus, it is desirable to use as much of the additive as possible without compromising the above properties or exceeding the solubility limit for the additive.

The crystallization-inhibiting additives useful for lowering the onset of crystallization have the tendency to form complexes with, and increase the surface energy of embryos formed just prior to nucleation. They include without limitation salts of bromine; salts of alkali metals including phosphates, chlorates, bromates, iodates, ferrocyanides, chlorides and the like; and organic compounds including crown ethers, dicarboxylic acids, tetracarboxylic acids, diphosphoric acids, diphosphonic acids, polyphosphoric acids, phosphates, formamides and the like; and combinations including one or more of the foregoing. Specific compounds found useful include potassium bromate, potassium ferrocyanide, ethylene diamine tetra-acetic acid (EDTA), phosphoric acid, malonic acid, malic acid, potassium iodate, adenosine triphosphate (ATP), adenosine diphosphate (ADP), 5-amino-2,4,6-trioxo-1,3-perhydrodizine-N,N-diacetic acid (uramil-N,N-diacetic acid), polyphosphoric acid (poly PA), 1-hydroxyethlidene-1,1-diphosphonic acid (HEDP), diethylene triamine penta (methylene phosphonic acid) (DTPMP), amino tri (methylene phosphonic acid) (ATMP), pyrophosphoric acid (PPA), methylene diphosphoric acid (MDPA), and combinations including one or more ofthem. Preferred additives include uramil N,N-diacetic acid, HEDP, DTPMP, ATMP, PPA, MDPA, and combinations thereof, at the concentrations stated above. The crystallization-inhibiting additive can simply be added in with the solution of refrigerant and absorbent.

The present invention is also directed to lowering the minimum operating temperatures of solutions containing lithium bromide in water, in the same or lower amounts of lithium bromide, and with or without other additives. For some applications (e.g. heating), lithium bromide may be present at levels of about 30–60% by weight, desirably about 40–50% by weight. Other additives may include, for instance, corrosion inhibitors (for example, molybdate) and alkaline treating agents (for example, lithium hydroxide). Other additives known in the art as anti-foaming agents include alcohols and glycols as described, for example, in U.S. Pat. Nos. 3.276.217: 3,553,136; 3.609,087; 3,643,455; and 3,783,631. Other additives also include other bromine salts as described in U.S. Pat. No. 3,004,919: other lithium salts as described in U.S. Pat. Nos. 3,316,728, 3,316,736, and 3,296,814; molybdates, borates and silicates as described in U.S. Pat. No. 5.547,600; amines as described in U.S. Pat. No. 5,577,388; thiocyanates as described in U.S. Pat. No. 5,653,117; and/or other additives known in the art.

For solutions containing lower amounts of lithium bromide, and/or compounds other than lithium bromide and water, the minimum operating temperature of the starting solution, as well as the effects of the various crystallization-inhibiting additives used in accordance with the invention, may differ in magnitude from the temperatures stated above for solutions containing only lithium bromide and water. However, the general practice of the invention is similar for these other solutions. The type and amount of the crystallization inhibitor should be selected to reduce the minimum operating temperature (onset of crystallization) for the solution by more than about 3° C., preferably more than 8° C., more preferably more than 10° C. most preferably more than 12° C., compared to the minimum operating temperature existing without any of the crystallization-inhibiting compound.

EXAMPLES

Solutions of refrigerant (water) and absorbent (lithium bromide) were prepared with and without various crystallization-inhibiting additives. Each solution contained between 60–61% by weight lithium bromide in water. For each solution the onset of crystallization temperature was measured by placing test tubes of the solution (initially at ambient temperature) in a cooling bath programmed for a cooling rate of 20° C. per hour. The temperature of each sample was measured as a function of time. As the temperature was lowered to the onset of crystallization, the heat of crystallization was released causing a brief rise in temperature. The following Table 1 show the onset of crystallization temperature measured for each solution. The solutions are listed in the order of increasing effectiveness of the crystallization inhibitor.

TABLE 1

Effects of Different Crystallization Inhibitors

| Example | % Li Bar | Crystallization Inhibitor | Amount of Inhibitor (molar ppm)* | Average Onset of Crystallization (° C.) |
|---|---|---|---|---|
| 1 (control) | 60.82 | None | — | 4.38** |
| 2 (control) | 60.54 | None | — | 3.30** |
| 3 | 60.82 | $TlCl_3$ | 500 | 3.17 |
| 4 | 60.54 | KBr | 589 | 2.75 |
| 5 | 60.54 | $C_2H_5NO$ | 500 | 2.68 |
| 6 | 60.54 | $ZnBr_2$ | 500 | 2.50 |
| 7 | 60.82 | $C_2H_4O_2$ (oxalic acid) | 500 | 1.28 |
| 8 | 60.54 | $KBrO_3$ | 575 | 0.40 |
| 9 | 60.54 | $K_4Fe(CN)_6$ | 500 | -0.01 |
| 10 | 60.82 | ATP | 250 | -1.05 |
| 11 | 60.54 | EDTA | 500 | -1.05 |
| 12 | 60.82 | ADP | 250 | -1.05 |
| 13 | 60.54 | $H_3PO_4$ | 500 | -1.96 |
| 14 | 60.54 | $C_3H_4O_4$ (malonic acid) | 500 | -2.09 |
| 15 | 60.54 | $C_4H_6O_5$ (malic acid) | 500 | -2.28 |
| 16 | 60.54 | $KIO_3$ | 250 | -4.31 |
| 17 | 60.82 | Poly PA | 500 | -4.73 |
| 18 | 60.54 | Uramil N,N-diacetic acid | 500 | -5.69 |
| 19 | 60.82 | HEDP | 500 | -6.15 |
| 20 | 60.82 | DTPMP | 500 | -6.67 |
| 21 | 60.82 | ATMP | 500 | -8.24 |
| 22 | 60.82 | PPA | 500 | -8.52 |
| 23 | 60.54 | MDPA | 250 | -10.16 |

*Molar ppm refers to moles of inhibitor per one million moles of LiBr.
**The solution of Example 1 had an equilibrium freezing temperature of 11.86° C.
The solution of Example 2 had an equilibrium freezing temperature of 12.99° C.

Some of the additives were tested at different concentrations to show the effect of different additive levels on the initial freezing point (onset of crystallization) of the aqueous lithium bromide solutions. As shown in the following, Table 2, the onset of crystallization generally becomes lower as the additive levels are increased. However, the correlation is not linear, and the onset of crystallization appears to approach a different low limit for each additive.

TABLE 2

Effects of Different Concentrations of Various Crystallization Inhibitors

| Additive Concentration (mole PPM#) | Crystallization Temperature Tmin ± Std. Deviation (° C.) | Additive Concentration (mole PPM#) | Crystallization Temperature Tmin ± Std. Deviation (° C.) |
|---|---|---|---|
| MDPA (Methylene Diphosphoric acid $CH_6P_2O_6$) in 60.82% LiBr | | PPA (pyrophosphoric acid $H_4P_2O_7$) in 60.82% LiBr | |
| 0 | 4.65 ± 0.56° C. | 0 | 4.65 ± 0.56° C. |
| 50 | -4.80 ± 3.67° C. | 200 | -9.55 ± 3.83° C. |
| 150 | -2.63 ± 5.11° C. | 500 | -8.52 ± 4.17° C. |
| 250 | -8.88 ± 3.17° C. | 750 | -8.89 ± 7.96° C. |
| ATMP (aminotri(methylenephosphonic acid)$N(CH_2PO_3H_2)_3$) in 60.82% LiBr | | DTPMP (Diethylene triamine penta(methylene phosphonic acid) $CH_2PO_3H_2N(C_2H_4N(CH_2PO_3H_2)_2)_2$) in 60.82% LiBr | |
| 0 | 4.65 ± 0.56° C. | 0 | 4.65 ± 0.56° C. |
| 200 | -5.93 ± 3.62° C. | 200 | -12.72 ± 3.56° C. |
| 500 | -8.24 ± 2.25° C. | 500 | -6.67 ± 6.79° C. |
| 1500 | -14.22 ± 0.74° C. | 1500 | -13.47 ± 2.20° C. |
| HEDP (1-Hydroxyethlidene-1,1-diphosphonic acid $CH_3C(OH)(PO_3H_2)_2$) in 60.82% LiBr diacetic acid | | Uramil-N,N-diacetic acid, also called 5-Amino-2,4,6-trioxo-1,3-perhydrodizine-N,N—$C_8H_9O_7N_3$) in 60.82% LiBr | |
| 0 | 4.65 ± 0.56° C. | 0 | 4.65 ± 0.56° C. |
| 200 | -10.97 ± 6.61° C. | 200 | -2.36 ± 2.69° C. |
| 500 | -6.15 ± 7.49° C. | 500 | -4.69 ± 3.73° C. |
| 1500 | -13.01 ± 1.71° C. | 1000 | -6.10 ± 3.30° C. |
| | | 1500 | -7.50 ± 2.38° C. |

While the embodiments of the invention described herein are presently considered preferred, various modifications and improvements can be made without departing from the spirit and scope of the invention. The scope of the invention is indicated by the appended claims, and all changes that fall within the meaning and range of equivalents are intended to be embraced therein.

We claim:

1. In an absorption heat pump, the improvement comprising an aqueous circulation fluid including an absorbent salt and a crystallization-inhibiting additive including 5-amino-2,4,6-trioxo-1,3-perhydrodizine-N,N-diacetic acid (uramil N,N-diacetic acid), the circulation fluid having a high cycle temperature and a low cycle temperature, wherein the low cycle temperature is not higher than -5° C. at a salt concentration of up to 62% by weight.

2. The absorption heat pump of claim 1, wherein the circulation fluid has a low cycle temperature not higher than -8° C. at a salt concentration of up to about 62% by weight.

3. The absorption heat pump of claim 1, wherein the circulation fluid has a low cycle temperature not higher than -10° C. at a salt concentration of up to about 62% by weight.

4. The absorption heat pump of claim 1, wherein the circulation fluid comprises about 30–85% by weight of an absorbent salt.

5. The absorption heat pump of claim 4, wherein the circulation fluid comprises about 40–75% by weight of the absorbent salt.

6. The absorption heat pump of claim 4, wherein the circulation fluid comprises about 55–65% by weight of the absorbent salt.

7. The absorption heat pump of claim 4, wherein the absorbent salt comprises lithium bromide.

8. The absorption heat pump of claim 1, wherein the crystallization-inhibiting additive is present at a level up to about 5000 molar ppm.

9. The absorption heat pump of claim 8, wherein the additive is present at a level of about 200–2000 molar ppm.

10. The absorption heat pump of claim 8, wherein the additive is present at a level of about 500–1500 molar ppm.

11. In an absorption heat pump, the improvement comprising an aqueous circulation fluid including at least an absorbent salt and a crystallization-inhibiting additive including 5-amino-2,4,6-trioxo-1,3-perhydrodizine-N,N-diacetic acid (uramil N,N-diacetic acid), the circulation fluid having a high cycle temperature and a low cycle temperature limited by an onset of crystallization, wherein the crystallization-inhibiting additive lowers the onset of crystallization by more than 8° C. at a salt concentration of up to 62% by weight compared to an otherwise similar circulation fluid devoid of the crystallization inducing additive.

12. The absorption heat pump of claim 11, wherein the crystallization-inhibiting additive lowers the onset of crystallization by more than 10° C. compared to an otherwise similar circulation fluid devoid of the crystallization inhibiting additive.

13. The absorption heat pump of claim 11, wherein the crystallization-inhibiting additive lowers the onset of crystallization by more than 12° C. compared to an otherwise similar circulation fluid devoid of the crystallization-inhibiting additive.

14. The absorption heat pump of claim 11, wherein the absorbent salt comprises at least lithium bromide.

15. In an absorption heat pump, the improvement comprising an aqueous circulation fluid including about 30–85% by weight lithium bromide salt and up to about 5000 molar ppm of a crystallization-inhibiting additive including 5-amino-2,4,6-trioxo-1,3-perhydrodizine-N,N-diacetic acid (uramil N,N-diacetic acid).

16. The absorption heat pump of claim 15 wherein the additive is present at a level of about 200–2000 molar ppm.

17. The absorption heat pump of claim 15, wherein the additive is present at a level of about 500–1500 molar ppm.

18. The absorption heat pump of claim 15, wherein the circulation fluid comprises about 40–75% by weight of the lithium bromide salt.

19. The absorption heat pump of claim 15, wherein the circulation fluid comprises about 55–65% by weight of the lithium bromide salt.

* * * * *